United States Patent
Song et al.

(10) Patent No.: US 8,913,472 B2
(45) Date of Patent: Dec. 16, 2014

(54) DATA CAPTURE DEVICE AND METHOD THEREOF

(71) Applicants: Chang-Jin Song, Kaohsiung (TW); Ping-Chiang Yang, Taichung (TW)

(72) Inventors: Chang-Jin Song, Kaohsiung (TW); Ping-Chiang Yang, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 31 days.

(21) Appl. No.: 13/747,491

(22) Filed: Jan. 23, 2013

(65) Prior Publication Data

US 2013/0235712 A1   Sep. 12, 2013

(30) Foreign Application Priority Data

Mar. 9, 2012  (TW) .............................. 101108147 A

(51) Int. Cl.
| | | |
|---|---|---|
| *G11B 7/00* | (2006.01) | |
| *G11B 20/10* | (2006.01) | |
| *G11B 20/12* | (2006.01) | |

(52) U.S. Cl.
CPC .......... *G11B 20/10* (2013.01); *G11B 20/10222* (2013.01); *G11B 2020/122* (2013.01); *G11B 2220/2537* (2013.01)
USPC ...................................... 369/59.17; 369/53.16

(58) Field of Classification Search
USPC .......... 369/59.17, 59.21, 47.48, 59.25, 53.16, 369/53.15
See application file for complete search history.

(56) References Cited

U.S. PATENT DOCUMENTS

| | | | | |
|---|---|---|---|---|
| 6,414,920 | B1* | 7/2002 | Lee ............................. | 369/47.31 |
| 6,728,181 | B2* | 4/2004 | Shimoda et al. ............. | 369/53.2 |
| 6,950,379 | B2* | 9/2005 | Yen et al. ...................... | 369/52.1 |
| 7,496,009 | B2* | 2/2009 | Chen .......................... | 369/47.22 |
| 7,821,910 | B2* | 10/2010 | Nakata et al. ............... | 369/275.3 |
| 7,861,142 | B2* | 12/2010 | Kobayashi et al. ........... | 714/769 |
| 8,385,174 | B2* | 2/2013 | Kikukawa ................... | 369/59.22 |
| 2002/0060968 | A1* | 5/2002 | Senshu ....................... | 369/59.25 |
| 2004/0052190 | A1* | 3/2004 | Sako et al. .................. | 369/59.24 |
| 2005/0163030 | A1* | 7/2005 | Irie et al. .................... | 369/275.3 |
| 2006/0092798 | A1* | 5/2006 | Lee et al. .................... | 369/53.16 |

\* cited by examiner

*Primary Examiner* — Thomas Alunkal
(74) *Attorney, Agent, or Firm* — Jianq Chyun IP Office

(57) ABSTRACT

A data capture device including a signal processing unit, a frequency locked circuit and a match circuit is provided. The signal processing unit converts a radio frequency signal to a return-to-zero signal. The frequency locked circuit estimates a minimum interval length by the return-to-zero signal in a plurality of detecting periods, and generates an enable signal according to the minimum interval length and the return-to-zero signal. The frequency locked circuit determines whether to calibrate the enable signal according to a distribution of a plurality of enable pulses in the enable signal to generate a sampling signal. The match circuit samples the return-to-zero signal by the sampling signal and generates a synchronization signal according to a sampling result. The match circuit generates a composite synchronization signal by a virtual signal and the synchronization signal, and captures a plurality of row data from the return-to-zero signal according to the composite synchronization signal.

24 Claims, 9 Drawing Sheets

| | 1 Bytes | 4 Bytes | | | |
|---|---|---|---|---|---|
| SB_BCA | | BCA_preamble value (4 Bytes 0x00) | | | |
| RS_BCA1 | I0 | I1 | I2 | I3 | |
| RS_BCA1 | I4 | I5 | I6 | I7 | |
| RS_BCA1 | I8 | I9 | I10 | I11 | |
| RS_BCA1 | . | . | . | . | |
| RS_BCA2 | . | . | . | . | |
| RS_BCA2 | . | . | . | . | |
| RS_BCA2 | . | . | . | . | |
| RS_BCA2 | . | . | . | . | |
| | . | . | . | . | |
| | . | . | . | . | |
| | . | . | . | . | |
| RS_BCAn | . | . | . | . | |
| RS_BCAn | . | . | . | . | |
| RS_BCAn | . | . | . | . | |
| RS_BCAn | | EDC_BCA(4 Bytes) | | | |
| RS_BCA13 | C0,0 | C1,0 | C2,0 | C3,0 | |
| RS_BCA13 | | ECC_BCA | | | |
| RS_BCA13 | | | | | |
| RS_BCA13 | C0,3 | C1,3 | C2,3 | C3,3 | |
| RS_BCA14 | | BCA_postamble value (4 Bytes 0x55) | | | |
| RS_BCA15 | | | | | |

FIG. 1 (RELATED ART)

| | Bit pattern | |
|---|---|---|
| | sync body<br>(channel bit)<br>C15~C8 | sync identification code<br>(data bit)<br>b3~b0 |
| SB_BCA | 0100_0110 | 0000 |
| RS_BCA1 | 0100_0110 | 0001 |
| RS_BCA2 | 0100_0110 | 0010 |
| RS_BCA3 | 0100_0110 | 0011 |
| RS_BCA4 | 0100_0110 | 0100 |
| RS_BCA5 | 0100_0110 | 0101 |
| RS_BCA6 | 0100_0110 | 0110 |
| RS_BCA7 | 0100_0110 | 0111 |
| RS_BCA8 | 0100_0110 | 1000 |
| RS_BCA9 | 0100_0110 | 1001 |
| RS_BCA10 | 0100_0110 | 1010 |
| RS_BCA11 | 0100_0110 | 1011 |
| RS_BCA12 | 0100_0110 | 1100 |
| RS_BCA13 | 0100_0110 | 1101 |
| RS_BCA14 | 0100_0110 | 1110 |
| RS_BCA15 | 0100_0110 | 1111 |

DATA CAPTURE DEVICE AND METHOD THEREOF

CROSS-REFERENCE TO RELATED APPLICATION

This application claims the priority benefit of Taiwan application serial no. 101108147, filed on Mar. 9, 2012. The entirety of the above-mentioned patent application is hereby incorporated by reference herein and made a part of this specification.

BACKGROUND OF THE INVENTION

1. Field of the Disclosure

The invention is directed to a data capture device and a method thereof, and more particularly, to a data capture device for capturing row data in a burst cutting area (BCA) and a method thereof.

2. Description of Related Art

Due to rampant pirated digital versatile disks (DVDs), it is limited to copy videos or contents from an optical disk having a mechanism of content protection for recordable media (CPRM) so as to protect videos or contents therein from being copied without any permission. Generally, a burst cutting area (BCA) of an optical disk is an area for recording information associated with the copyright and required information for decoding the contents in the optical disk.

For example, FIG. 1 is a schematic view corresponding to a BCA in an optical disk specification. As shown in FIG. 1, each row has 5 bytes, and the first byte of each row is a synchronization byte SB_BCA or resynchronization bytes RS_BCA1~RS_BCA15. Therefore, the synchronization byte SB_BCA and the resynchronization bytes RS_BCA1~RS_BCA15 require to be detected in advance so that a following row data (e.g. I0~I11, etc.) can be decoded.

Furthermore, FIG. 2 is bit pattern corresponding to the synchronization bytes and the resynchronization bytes in the optical disk specification. As shown in FIG. 2, each of the synchronization bytes SB_BCA and each of the resynchronization bytes RS_BCA1~RS_BCA15 respectively include a sync body and a sync identification code. Here, the size of the sync body is approximately 8 channel bits, and the size of the sync identification code is approximately 4 data bits. Besides, the synchronization byte SB_BCA and the resynchronization bytes RS_BCA1~RS_BCA15 have the same sync bodies.

Generally, when the optical disk is played, in the related art, a sampling signal is initially estimated, and then, sync bodies and sync identification codes in the BCA are detected by the sampling signal so as to obtain a synchronization signal required by the BCA. For example, an US publication no. 2006/0092798 provides a method regarding how to estimate a sampling signal, and an U.S. Pat. No. 6,414,920 provides a method in connection with how to detect a synchronization signal.

According to US publication no, 2006/0092798, a maximum interval length of a return-to-zero signal is detected. Meanwhile, speaking of the optical disk specification, the maximum interval length is normally 4 T, where a T indicates a time interval of a channel bit. Thus, the maximum interval length described in said publication is divided by 4 so as to obtain the sampling signal. However, when it happens to a situation that signals of the optical disk are not evenly distributed or the optical disk is scraped, it would result in the detected maximum interval larger than normal 4 T and the mistakenly estimated sampling signal. For example, FIG. 3 is a time sequence diagram used for describing that a synchronization signal can not be generated by the related art. As shown in FIG. 3, when a maximum interval length of a return-to-zero signal RZ is larger than normal 4 T, a wrong sampling signal den is generated. At this time, from the return-to-zero signal RZ of 4 T, three signal patterns RZ_pa are captured. However, under a normal situation, from the return-to-zero signal RZ of 4 T, there should be four signal patterns to be captured. Then, at this time, the sync bodies and the sync identification codes can not be detected so that the synchronization signal sync can not be generated.

According to U.S. Pat. No. 6,414,920, the sync identification codes are detected either whether to be 0000 and 0001 in turn, or whether to be continuously 0001 for four times simultaneously. If either of the above conditions is satisfied, a decoding procedure is started to be execute to capture the row data in the BCA. However, when a portion or all of the sync identification codes having four sync bodies of 0001 are destroyed by bolts or scraped, even though the row data in the BCA is not destroyed by bolts or scraped, such method would result in a problem that the sync bodies are searched repeatedly, and the decoding procedure can not be started. In addition, when the sync bodies having the sync identification codes of 1111 are destroyed or scraped, the decoding procedure can not be ended by such method. That is, when the sync bodies having the sync identification codes of 0000 and 0001 are destroyed by bolts or scraped, the decoding procedure can not be executed successfully.

SUMMARY

The invention is directed to a data capture device, in which an enable signal is generated according to a minimum interval length so that the enable signal is calibrated appropriately so as to form a sampling signal. Thereby, it becomes less possible to mistakenly estimate the sampling signal and helpful to reduce hardware space and manufacturing cost of the data capture device.

The invention is directed to a method of data capture to capture a row data according to a composite synchronization signal generated by a virtual signal and a synchronization signal so that the start and the end of a decoding procedure still can be determined successfully.

The invention is directed to a data capture device including a signal processing unit, a frequency locked circuit and a match circuit. The signal processing unit converts a radio frequency signal to a return-to-zero signal. The frequency locked circuit estimates a minimum interval length by the return-to-zero signal in a plurality of detecting periods and generates an enable signal according to the minimum interval length and the return-to-zero signal. In addition, the frequency locked circuit determines whether to calibrate the enable signal according to a distribution of a plurality of enable pulses in the enable signal so as to generate a sampling signal. The match circuit samples the return-to-zero signal by the sampling signal, and generates a synchronization signal according to a sampling result. Besides, the match circuit generates a composite synchronization signal by a virtual signal and the synchronization signal and captures a plurality of row data from the return-to-zero signal according to the composite synchronization signal.

In one embodiment of the invention, the frequency locked circuit includes an interval detector and an interval calibrator. The interval detector generates a plurality of reference interval values in the plurality of detecting periods and estimates the minimum interval length according to the plurality of reference interval values. Meanwhile, the interval detector generates the enable signal by referring to the return-to-zero signal and the minimum interval length. Here, within each of the detecting periods, the interval detector obtains a plurality of pulse interval values by detecting a falling edge of a plurality of return-to-zero pulses in the return-to-zero signal and selects one from the pulse interval values as one of the reference interval values. The interval calibrator detects an interval between each of the plurality of enable pulses so as to generate a maximum calibration value and a minimum calibration value. Meanwhile, the interval calibrator determines whether to calibrate the enable signal according to the maximum calibration value and the minimum calibration value so as to generate the sampling signal.

In one embodiment of the invention, the interval calibrator determines whether ½ of the maximum calibration value is larger than the minimum calibration value. Here, when ½ of the maximum calibration value is larger than the minimum calibration value, the interval calibrator calibrates the enable signal and outputs the calibrated enable signal as the sampling signal. When ½ of the maximum calibration value is smaller than the minimum calibration value, the interval calibrator directly outputs the enable signal as the sampling signal.

In one embodiment of the invention, the match circuit includes a synchronization signal generator, a virtual signal generator, and a data capturer. The synchronization signal generator samples the return-to-zero signal according to the sampling signal to generate a signal pattern corresponding to the return-to-zero signal. In addition, the synchronization signal generator detects a plurality of sync bodies in the signal pattern and generates the synchronization signal consisting of a plurality of synchronization pulses according to a detecting result When a first synchronization pulse in the plurality of synchronization pulses is detected, the virtual signal generator starts to generate the virtual signal and automatically generates a virtual pulse in the virtual signal per a predetermined time period. The data capturer compensates the synchronization signal by the virtual signal to generate the composite synchronization signal consisting of a plurality of composite pulses. In addition, the data capturer samples the return-to-zero signal according to the composite synchronization signal to capture the plurality of row data therefrom.

In one embodiment of the invention, the data capturer detects a plurality of sync identification codes in the signal pattern according to the plurality of composite pulses and compares the plurality of sync identification codes with a first predetermined code and a second predetermined code. Here, when a first sync identification code in the plurality of sync identification codes matches the first predetermined code, the data capturer executes the decoding procedure, and during the decoding procedure, when a second sync identification code in the plurality of sync identification codes matches the second predetermined code, the data capturer terminates the decoding procedure. In addition, the data capturer captures the plurality of row data by the decoding procedure.

According to another aspect of the invention, a method of data capture is provided, which includes steps as follows: converting an RF signal to a return-to-zero signal, estimating a minimum interval length by the return-to-zero signal in a plurality of detecting periods, generating an enable signal according to the minimum interval length and the return-to-zero signal, determining whether to calibrate the enable signal according to a distribution of a plurality of enable pulses in the enable signal so as to generate a sampling signal, sampling the return-to-zero signal by the sampling signal, generating a synchronization signal according to a sampling result, generating a composite synchronization signal by a virtual signal and the synchronization signal and capturing a plurality of row data from the return-to-zero signal according to the composite synchronization signal.

In one embodiment of the invention, steps for determining whether to calibrate the enable signal according to a distribution of a plurality of enable pulses in the enable signal so as to generate a sampling signal include detecting an interval between the plurality of enable pulses so as to generate a maximum calibration value and a minimum calibration value and determining whether to calibrate the enable signal according to the maximum calibration value and the minimum calibration value so as to generate the sampling signal.

In one embodiment of the invention, steps for sampling the return-to-zero signal by the sampling signal so as to generate the synchronization signal according to the sampling result include sampling the return-to-zero signal by the sampling signal to generate a signal pattern corresponding to the return-to-zero signal, detecting a plurality of sync bodies in the signal pattern and generating the synchronization signal consisting of a plurality of synchronization pulses according to a detecting result.

To sum up, in the invention, the enable signal is generated according to the minimum interval length and appropriately calibrated so that the sampling signal is formed. Further, in the invention, the row data is captured by the composite synchronization signal generated by the virtual signal and the synchronization signal. Thereby, it is less possible to mistakenly estimate the sampling signal and helpful to reduce the hardware dimension and the manufacturing cost of the data capture device. Further, even if the sync body is destroyed by blots or scraped, the start and the end of the decoding procedure still can be determined successfully.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 1 is a schematic view corresponding to a burst cutting area (BCA) in an optical disk specification.

DESCRIPTION OF EMBODIMENTS

Figures 2, 3:
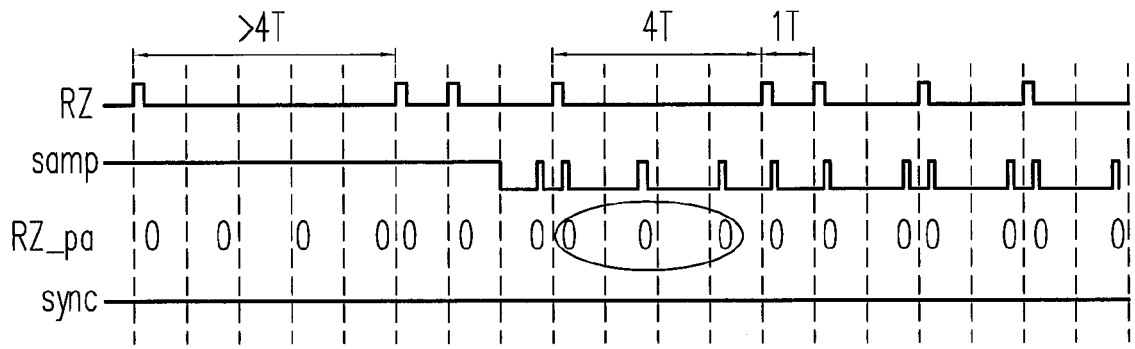
FIG. 2 is bit pattern corresponding to synchronization bytes and resynchronization bytes in the optical disk specification.
FIG. 3 is a time sequence diagram used for describing that a synchronization signal can not be generated by the related art.
Figure 4:
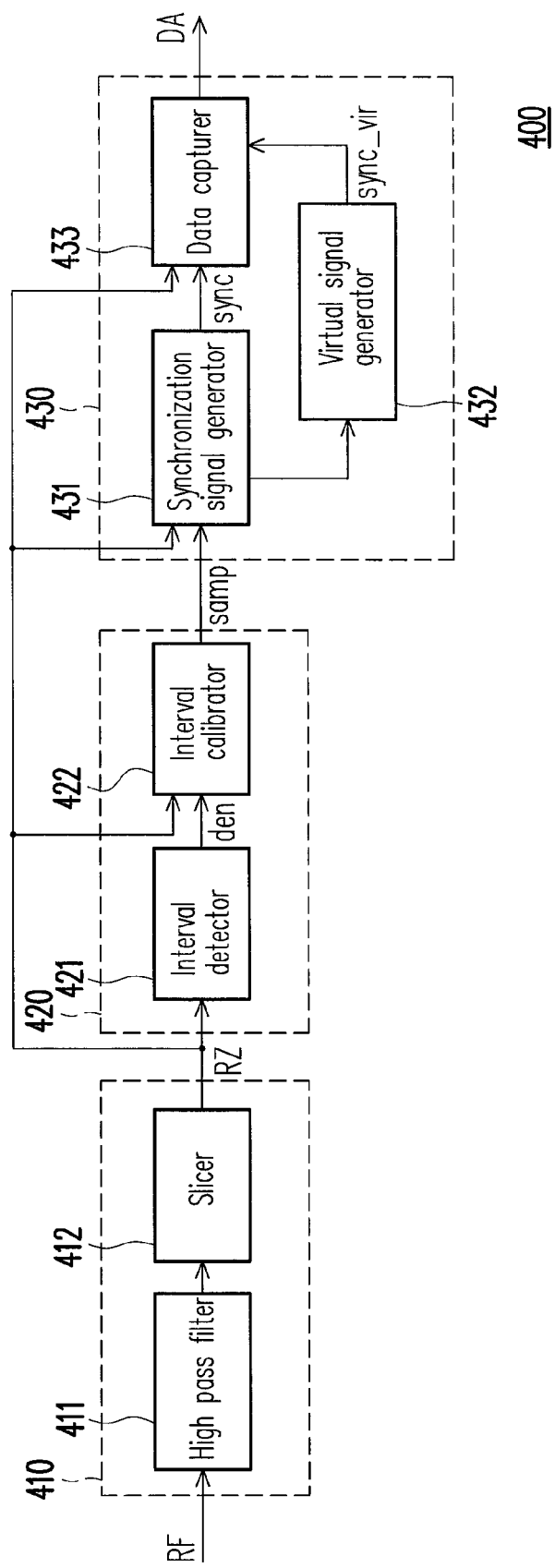
FIG. 4 is a schematic diagram showing a data capture device according to one embodiment of the invention.

FIG. 4 is a schematic diagram showing a data capture device according to one embodiment of the invention. Referring to FIG. 4, a data capture device 400 is provided, which includes a signal processing unit 410, a frequency locked circuit 420 and a match circuit 430. As shown in FIG. 4, the signal processing unit 410 receives a radio frequency (RF) signal corresponding to a burst cutting area (BCA) in an optical disk. That is, when a light beam emitted by an optical pickup head illuminates the BCA, an RF signal generated thereby is transmitted to the signal processing unit 410.

For operation, the signal processing unit 410 converts the RF signal to a return-to-zero signal RZ. For example, in an exemplary embodiment, the signal processing unit 410 includes a high pass filter (HPF) 411 and a slicer 412. Therein, the HPF 411 filters high frequency noises out of the RF signal. The slicer 412 slices the filtered RF signal into a digital signal of "0" or "1", i.e. the return-to-zero signal RZ. In other words, the signal processing unit 410 converts the RF signal into a corresponding binary signal.

The frequency locked circuit 420 estimates a minimum interval length by the return-to-zero signal RZ in a plurality of detecting periods and generates an enable signal den according to the minimum interval length and the return-to-zero signal RZ. Here, the minimum interval length is approximately 1 T as estimated. In other words, the frequency locked circuit 420 uses 1 T as a basis to generate the enable signal den. Therefore, even though the maximum interval length of the return-to-zero signal RZ is larger than 4 T, a correct enable signal den can be generated according to the present embodiment. Further, comparing with the related art, the related art requires a counter with a larger bit number to detect the maximum interval length of the return-to-zero signal RZ. On the contrary, the present embodiment can utilize a counter with a smaller bit number to detect the minimum interval length of the return-to-zero signal RZ so that the hardware space and manufacturing cost of the data capture device 300 are further decreased.

In addition, for ensuring that the estimated minimum interval length is not smaller than 1 T, which would further result in a wrong sampling signal samp, before generating the sampling signal samp by the enable signal den, the frequency locked circuit 420 further determines whether to calibrate the enable signal den according to a distribution of a plurality of enable pulses in the enable signal den so as to generate the sampling signal samp. Therefore, the reliability of the sampling signal samp can be ensured so as to generate a synchronization signal successfully.

For example, in an exemplary embodiment, the frequency locked circuit 420 includes an interval detector 421 and an interval calibrator 422. The interval detector 421 detects the return-to-zero pulses in the return-to-zero signal RZ and continuously accumulates a count of the return-to-zero pulses detected within a detecting period to generate a first count value PU_CNT corresponding thereto. Here, when the count of the detected return-to-zero pulses reaches a first predetermined value, the interval detector 421 enters into the next detecting period and accumulate the count of the return-to-zero pulses again. Besides, in an actual application, the interval detector 421 can use a second count value 1 T_CNT to record the repeatedly accumulated count of the return-to-zero pulses so as to determine which detecting period is currently in.

Figure 5:
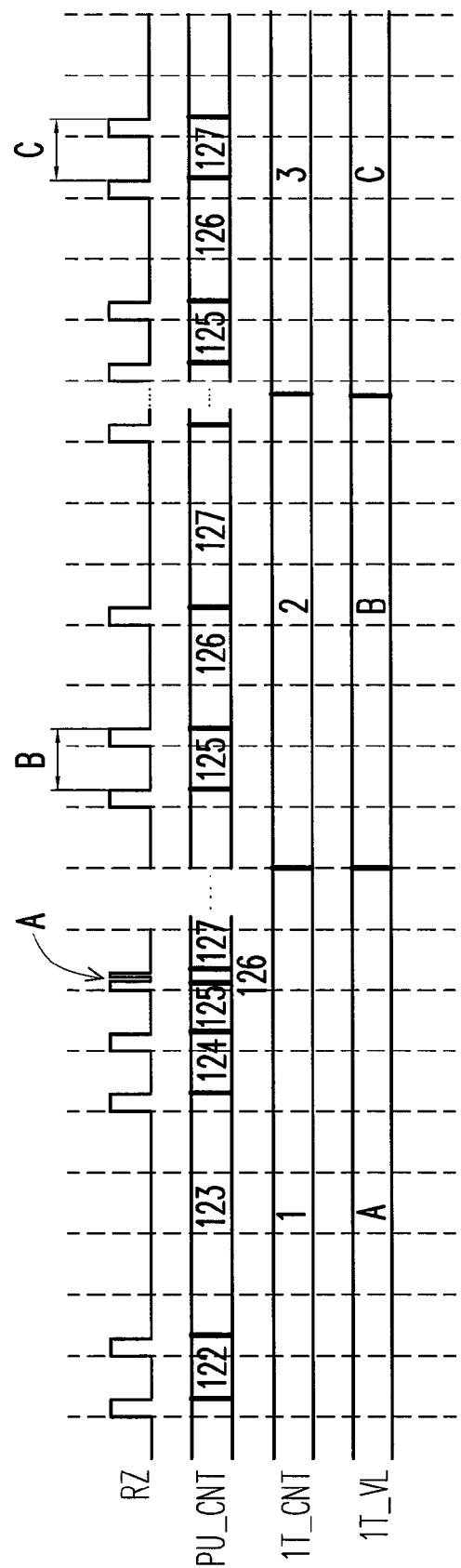
FIG. 5 is an operation time sequence diagram of an interval detector according to one embodiment of the invention.

For example, FIG. 5 is an operation time sequence diagram of an interval detector according to one embodiment of the invention. As shown in FIG. 5, at the beginning, the second count value 1 T_CNT is initially at 1, which indicates that the interval detector 421 is in a first detecting period. Meanwhile, during the first detecting period, the interval detector 421 continuously counts the detected return-to-zero pulses and updates the first count value PU_CNT according to the counting result. Here, when the first count value PU_CNT is equal to the first predetermined value (e.g. 128), the interval detector 421 resets the first count value PU_CNT to zero so that the return-to-zero pulses are re-counted, and the interval detector 421 accumulates the second count value 1 T_CNT to 2, which indicates that interval detector 421 is in a second detecting period.

Similarly, within the second detecting period, the interval detector 421 continuously counts the detected return-to-zero pulses and updates the first count value PU_CNT according to the counting result. Here, when the first count value PU_CNT is again equal to the first predetermined value, the interval detector 421 resets the first count value PU_CNT to zero again and accumulates the second count value 1 T_CNT to 3. Then, the interval detector 421 is in a third detecting period, and the operation as described above is repeated.

The interval detector 421 further determines whether to restart accumulating the return-to-zero pulses according to the second count value 1 T_CNT. For example, when the second count value 1 T_CNT is accumulated to the second predetermined value (e.g. 4), the interval detector 421 restarts counting the return-to-zero pulse. In other words, if the first predetermined value is 128, and the second predetermined value is 4, which indicates that the interval detector 421 continuously counts the return-to-zero pulses for three continuous detecting periods, within each of the three detecting periods, one hundred and twenty-eight of the return-to-zero pulses is detected by the interval detectors 421. That is, the one hundred and twenty-eight return-to-zero pulses sequentially appearing for three times is detected by the interval detector 421.

Besides, within each of the detecting periods, the interval detector 421 detects a falling edge of each of the return-to-zero pulses to calculate an interval between two adjacent return-to-zero pulses so as to generate a pulse interval value corresponding thereto. Accordingly, with the return-to-zero pulses continuously appearing, the interval detector 421 obtains a plurality of pulse interval values according to the detected return-to-zero pulse within each of the detecting periods. In addition, within each of the detecting periods, the interval detector 421 further selects a minimum pulse interval value from the obtained pulse interval values as a reference interval value1 T_VL.

For example, as shown in FIG. 5, 1 T_VL is used for indicating a plurality of reference interval values generated in turn by the interval detector 421. Within the first detecting period, a pulse interval value A is the minimum, and thus, the reference interval value generated by the interval detector 421 in the first detecting period is A. Similarly, within the second detecting period, the pulse interval value B is the minimum, and thus, the reference interval value generated by the interval detector 421 in the second detecting period is B. Likewise, the reference interval value generated by the interval detector 421 in a third detecting period is C.

As for the plurality of reference interval values generated within the plurality of detecting periods, the interval detector 421 selects a maximum reference interval value from the plurality of the reference interval values. For example, if the reference interval values A~C is sequentially generated by the interval detector 421 within the three detecting periods, the interval detector 421 compares the reference interval values A~C. If a result of aforementioned comparison is B>C>A, the interval detector 421 sets the maximum reference interval value B as a minimum interval length. In other words, the interval detector 421 estimates the minimum interval length according to the plurality of reference interval values.

Figure 6:
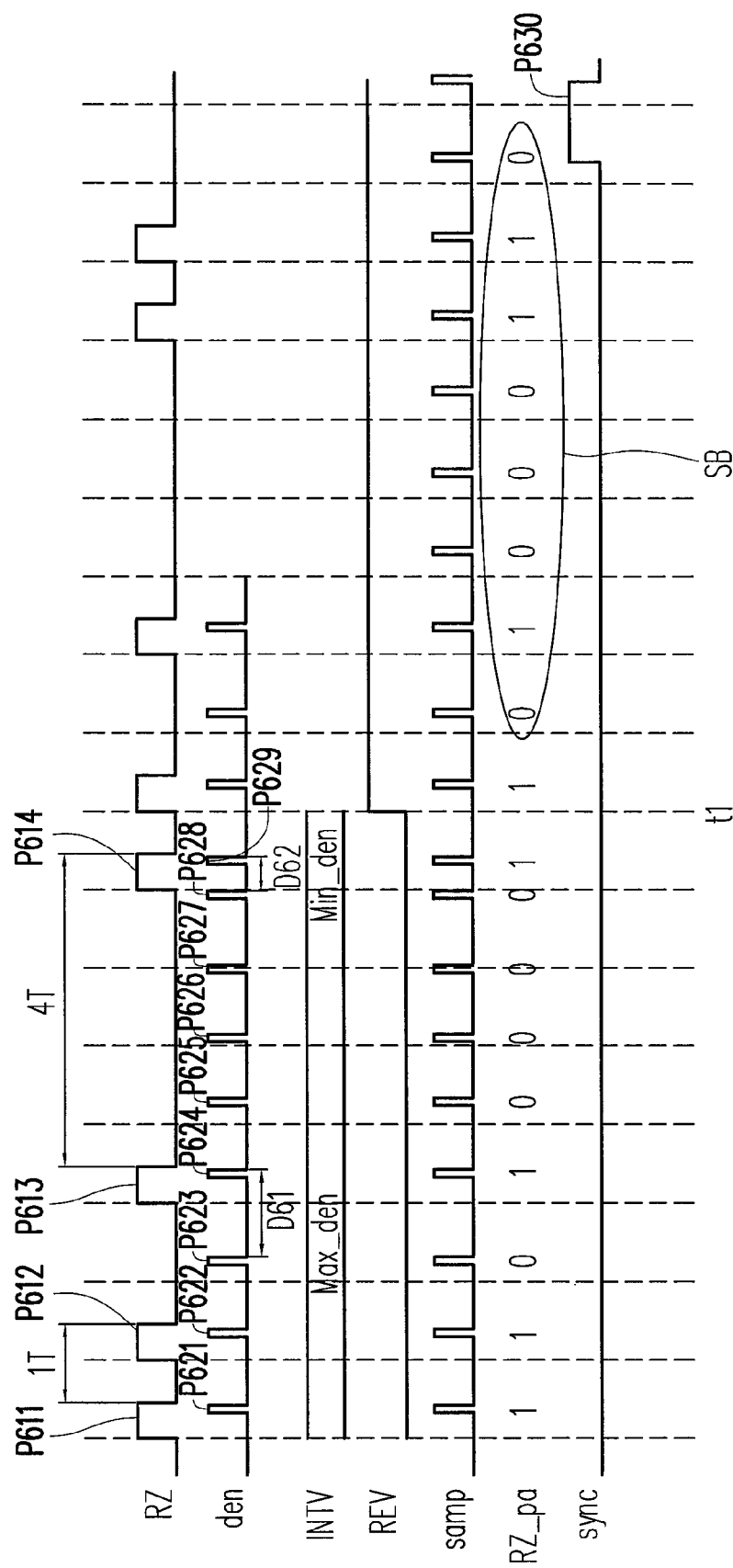
FIG. 6 is an operation time sequence diagram of a frequency locked circuit and a match circuit according to one embodiment of the invention.

Meanwhile, the interval detector 421 generates an enable signal den by referring to the minimum interval length and the return-to-zero signal RZ. For example, FIG. 6 is an operation time sequence diagram of a frequency locked circuit and a match circuit according to one embodiment of the invention. As shown in FIG. 6, the interval detector 421 uses each return-to-zero pulse in the return-to-zero signal RZ as a starting point to re-generate the enable pulse and uses the minimum interval length as the interval to generate the following enable pulses in turn. For example, when a return-to-zero pulse 611 is detected, the interval detector 421 generates an enable pulse P621 corresponding to a return-to-zero pulse P611. In addition, since the interval from the enable pulse P621 to a next return-to-zero pulse P612 is smaller than the minimum interval length, the interval detector 421 no longer generates any further enable pulses between the enable pulse P621 and the return-to-zero pulse P612.

Otherwise, considering the return-to-zero pulse P612 as the starting point, when the return-to-zero pulse P612 is detected, the interval detector 421 generates an enable pulse P622 corresponding to the return-to-zero pulse P612. Besides, since the interval from the enable pulse P622 to a next return-to-zero pulse P613 is larger than the minimum interval length, the interval detector 421 continuously generates a enable pulse P623 based on the minimum interval length, i.e. the interval between the enable pulse P622 and the enable pulse P623 is equal to the minimum interval length.

It should be noted that if signals of the optical disk are not evenly distributed, it may result in the minimum interval length estimated by interval detector 421 being smaller than 1 T so that a synchronization signal may not be generated successfully. For example, under a normal situation, for a return-to-zero signal RZ of 4 T, only four signal patterns are captured. However, when the estimated minimum interval length is smaller than 1 T, as shown in FIG. 6, the interval detector 421 generates five enable pulses P624~P628 corresponding to the return-to-zero signal RZ of 4 T so as to obtain five signal patterns. Meanwhile, the synchronization signal may not be generated successfully to obtain a row data.

To avoid the aforesaid situation, the interval calibrator 422 appropriately calibrates the enable signal den so as to generate the sampling signal samp corresponding thereto. For example, as shown in FIG. 6, a calibration signal REV is provided by the interval calibrator 422, and the calibration signal REV is initially set at a first level (e.g. logic 0). In addition, when the calibration signal REV is at the first level, the interval calibrator 422 detects the enable pulses (e.g. P621~P629) in the enable signal den and calculates the interval between two adjacent enable pulses to generate a plurality of interval values.

Besides, the interval calibrator 422 selects a maximum interval value and a minimum interval value from the plurality of interval values as a maximum calibration value Max_den and a minimum calibration value Min_den repespectively. For example, as shown in FIG. 6, INTV is the calibration value generated by the interval calibrator 422. Here, the interval calibrator 422 sets a interval value D61 between the enable pulses P623 and P62 as the maximum calibration value Max_den and sets a interval value D62 between the enable pulses P628 and P629 as the minimum calibration value Min_den. Further, the interval calibrator 422 determines whether to calibrate the enable signal den according to the maximum calibration value Max_den and the minimum calibration value Min_den.

For example, regarding the operation of the calibration of the enable signal den, the interval calibrator 422 compares a half of the maximum calibration value Max_den with the minimum calibration value Min_den and determines whether the half of the maximum calibration value Max_den is larger than the minimum calibration value Min_den. If the half of the maximum calibration value Max_den is larger than the minimum calibration value Min_den, i.e. $\frac{1}{2} \times$ Max_den>Min_den, the interval calibrator 422 substitutes the maximum calibration value Max_den and the minimum calibration value Min_den in to a formula, as shown in formula (1) so as to obtain an interval lock value Lock_den.

$$\text{Lock\_den} = \text{Max\_den} - \frac{1}{4} \times \text{Min\_den} \qquad \text{formula (1)}$$

Thereby, the interval calibrator 422 uses the interval lock value Lock_den as calibrated enable signal den to reset the minimum interval length and switch the calibration signal REV to a second level. With switching the calibration signal REV to the second level, the interval calibrator 422 refers to the reset minimum interval length and the return-to-zero signal RZ to generate the calibrated enable signal den as the sampling signal samp. Otherwise, if the half of the maximum calibration value Max_den is smaller than the minimum calibration value Min_den, i.e. $\frac{1}{2} \times$ Max_den<Min_den, the interval calibrator 422 directly outputs the enable signal den from the interval detector 421 as the sampling signal samp. In other words, taking FIG. 6 as an example, the sampling signal samp before a time point t1 is directly formed by the enable signal den, while the sampling signal samp after the point t1 is formed by the calibrated enable signal den.

Continuously referring to FIG. 4, the match circuit 430 samples the return-to-zero signal RZ by the sampling signal samp and generates the synchronization signal sync according to a sampling result. Besides, the match circuit generates a composite synchronization signal sync_det by a virtual signal sync_vir and the synchronization signal sync and captures a plurality of row data from the return-to-zero signal RZ according to the composite synchronization signal sync_det.

For example, in the embodiment as shown in FIG. 4, the match circuit 430 includes a synchronization signal generator 431, a virtual signal generator 432 and a data capturer 433. For operation, the synchronization signal generator 431 samples return-to-zero signal RZ according to the sampling signal samp to generate a signal pattern RZ_pa corresponding to the return-to-zero signal RZ. Meanwhile, the synchronization signal generator 431 further detects a plurality of sync bodies in the signal pattern RZ_pa so as to generate a plurality of synchronization pulses corresponding to the sync bodies to form the synchronization signal sync. For example, as shown in FIG. 6, when a sync body SB is detected by the synchronization signal generator 431, the synchronization signal generator 431 generates a synchronization pulse P630 corresponding thereto.

It is noted that referring to FIG. 1, as for the optical disk specification, each of the synchronization bytes SB_BCA and each of the resynchronization bytes RS_BCA1~RS_BCA15 is separated from each other by an interval of four bytes, and that is, each of the sync bodies appears per four bytes. Accordingly, the virtual signal generator 432 of the present embodiment utilizes the characteristic of each sync body appearing per four bytes to generate the virtual signal sync_vir.

For operation, the virtual signal generator 432 sets a time period of four bytes as a predetermined time period in advance. Thereby, when the synchronization pulse appearing in the synchronization signal sync for the first time (i.e. a first synchronization pulse) is detected by the virtual signal generator 432, the virtual signal generator 432 starts to count and re-counts per the predetermined time period. By this way, the virtual signal generator 432 automatically generates a virtual pulse according to a counting result per the predetermined time period so as to form the virtual signal sync_vir. In other words, when the first synchronization pulse in the synchronization signal sync is detected, the virtual signal generator 432 automatically generates the virtual pulse in the virtual signal sync_vir per the predetermined time period.

Figure 7:
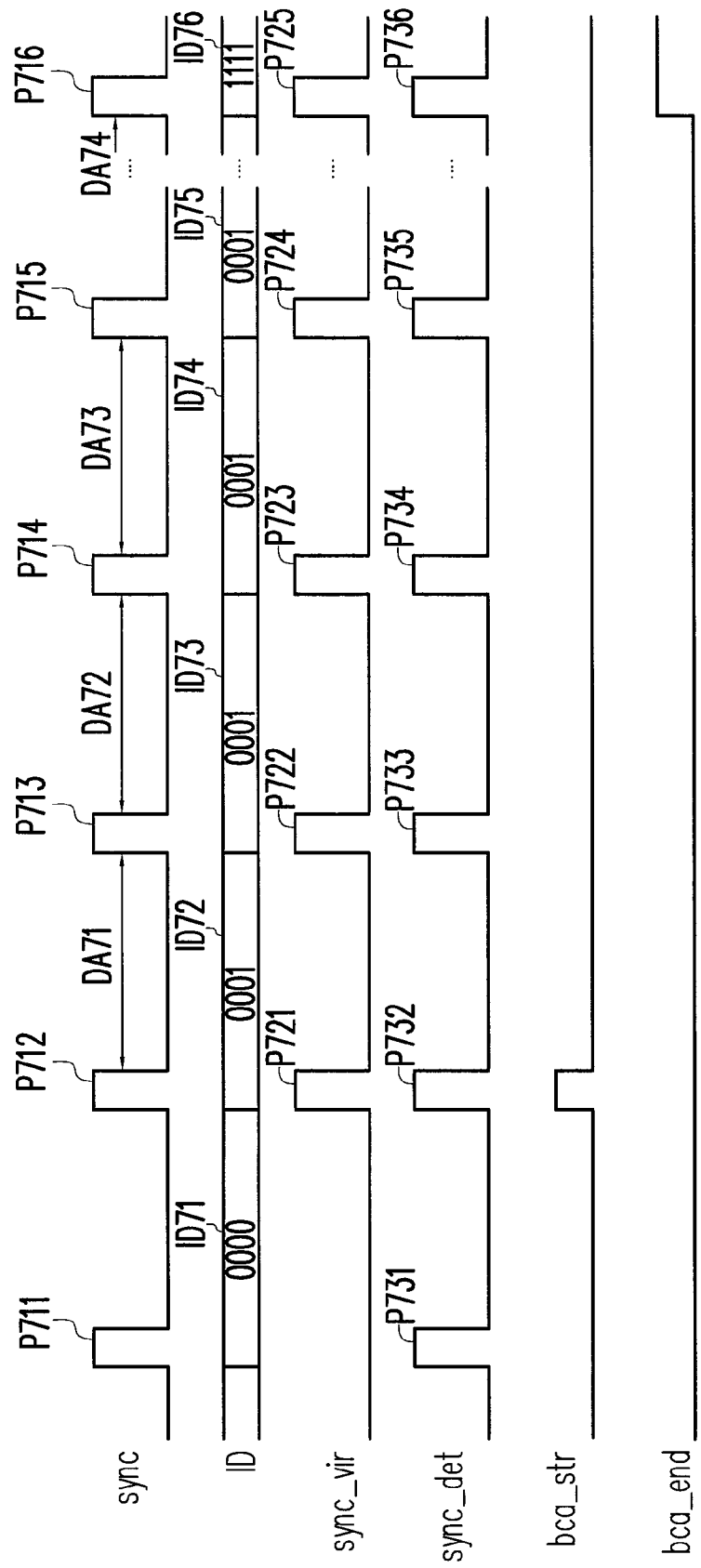
FIG. 7 is an operation time sequence diagram of a match circuit according to one embodiment of the invention.

For example, FIG. 7 is an operation time sequence diagram of a match circuit according to one embodiment of the invention. Referring to FIG. 7, when the synchronization signal sync is under a normal condition, a sync body is detected by the synchronization signal generator 431 per four bytes, and therefore, a plurality of synchronization pulses P711~P716 in the synchronization signal sync is separated from each other for four bytes. On the other hand, when the synchronization pulse P711 is detected by the virtual signal generator 432, the virtual signal generator 432 automatically generates a virtual pulse per four bytes to form a virtual signal sync_vir consisting of a plurality of virtual pulses P721~P725.

The data capturer 433 uses the virtual signal sync_vir to compensate the synchronization signal sync so as to generate the composite synchronization signal sync_det. For detailed operation, the data capturer 433 simultaneously detects the virtual pulses in the virtual signal sync_vir and the synchronization pulses in the synchronization signal sync. When either of the virtual pulse and the synchronization pulse is detected, the data capturer 433 outputs a composite pulse corresponding thereto so as to form the composite synchronization signal sync_det.

For example, as shown in FIG. 7, in an embodiment, the data capturer 433 generates a corresponding composite pulse P731 according to the synchronization pulse P711. Besides, when the synchronization pulse P712 and the virtual pulse P721 appears simultaneously, the data capturer 433 generates a corresponding composite pulse P732 according to either of the synchronization pulse P712 and the virtual pulse P721. Likewise, the data capturer 433 generates composite pulses P733~P736. In other words, under the situation where the sync bodies are not destroyed, the composite synchronization signal sync_det is equivalent to the synchronization signal sync.

Figure 8:
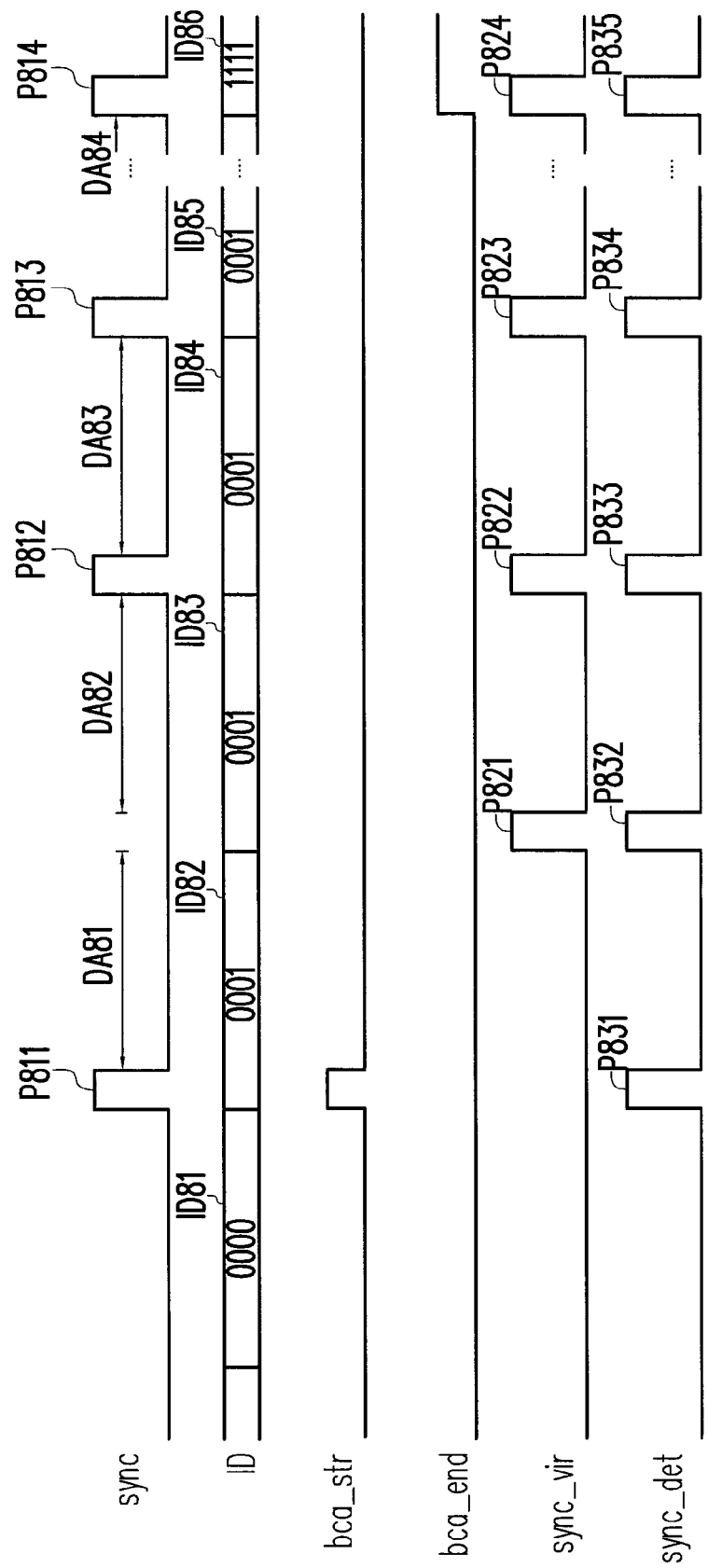
FIG. 8 is an operation time sequence diagram of a match circuit according to another embodiment of the invention.

FIG. 8 is an operation time sequence diagram of a match circuit according to another embodiment of the invention. Referring to FIG. 8 according to another embodiment, the data capturer 433 generates a corresponding composite pulse P831 according to a synchronization pulse P811. In addition, when only a virtual pulse P821 appears, the data capturer 433 also generates a corresponding composite pulse P832 according to the virtual pulse P821. Further, when a synchronization pulse P812 and a virtual pulse P822 simultaneously appears, the data capturer 433 generates a composite pulse P833 according to either of the synchronization pulse P812 and the virtual pulse P822. Likewise, the data capturer 433 generates composite pulses P834~P835. In other words, when the sync body is destroyed, the data capturer 433 uses a portion of the virtual pulses P821~P824 to compensate the synchronization signal sync so as to generate the composite synchronization signal sync_det.

The data capturer 433 further captures a row data DA from the return-to-zero signal RZ according to the composite synchronization signal sync_det. For example, referring to FIG. 7, in an embodiment, sync identification codes ID71~ID76 are detected by the data capturer 433 according to the composite pulses P731~P736 in the composite synchronization signal sync_de. In addition, the data capturer 433 further uses a first predetermined code {0001} and a second predetermined code {1111} to compare the sync identification codes ID71~ID76. Here, when the detected sync identification ID72 matches the first predetermined code {0001}, the data capturer 433 generates a starting signal bca_str to start to execute a decoding procedure. Meanwhile, during the decoding procedure, when the detected sync identification ID76 matches the second predetermined code {1111}, the data capturer 433 generates an ending signal bca_end to terminate the decoding procedure. Further, the data capturer 433 captures row data DA71~DA74 by the decoding procedure.

In detail, the data capturer 433 initially compares the detected sync identification code with the first predetermined code {0001} and then, determines whether to execute the decoding procedure. Meanwhile, during the decoding procedure, the data capturer 433 compares the detected sync identification code with the second predetermined code {1111} and determines whether to terminate the decoding procedure. For example, during the decoding procedure, at the beginning, the data capturer 433 captures the row data DA71. Next, a sync identification code ID73 is detected by the data capturer 433 according to the composite pulse P733, and the sync identification code ID73 is determined whether it matches the second predetermined code {1111}. At this time, since the sync identification code ID73 does not match the second predetermined code {1111}, the data capturer 433 captures a row data DA72. Similarly, a sync identification code ID74 is detected by the data capturer 433 according to the composite pulse P734, and the sync identification code ID74 is determined as not matching the second predetermined code {1111} so that a row data DA73 is captured. Likewise, the data capturer 433 captures the row data DA74.

In another embodiment as shown in FIG. 8, sync identification codes ID82~ID86 are detected by the data capturer 433 according to composite pulses P831 though P835 in the composite synchronization signal sync_det. In addition, the data capturer 433 further uses the first predetermined code {0001} and the second predetermined code {1111} to compare the sync identification codes ID82~ID86. Here, when the detected sync identification code ID82 matches the first predetermined code {0001}, the data capturer 433 generates the starting signal bca_str to start to execute the decoding procedure. Meanwhile, during the decoding procedure, when the detected sync identification code ID86 matches the second predetermined code {1111}, the data capturer 433 generates the ending signal bca_end to terminate executing the decoding procedure. Further, the data capturer 433 captures row data DA81~DA84 by the decoding procedure.

As for the embodiment as shown in FIG. 8, when the sync body corresponding to the sync identification code ID82 is detected by the synchronization signal generator 431, the virtual signal generator 432 automatically generates a virtual pulse per four bytes. With the virtual pulses generated in turn, it is equivalent to the corresponding sync bodies detected by the synchronization signal generator 431. Accordingly, by the composite synchronization signal sync_det generated by the virtual signal sync_vir and the synchronization signal sync to capture the row data, it can be sure that the decoding procedure is successfully completed. For example, referring to FIG. 8, even though the sync body corresponding to sync identification code ID81 can not be detected, the composite synchronization signal sync_det still can be used to execute the decoding procedure.

Figure 9:
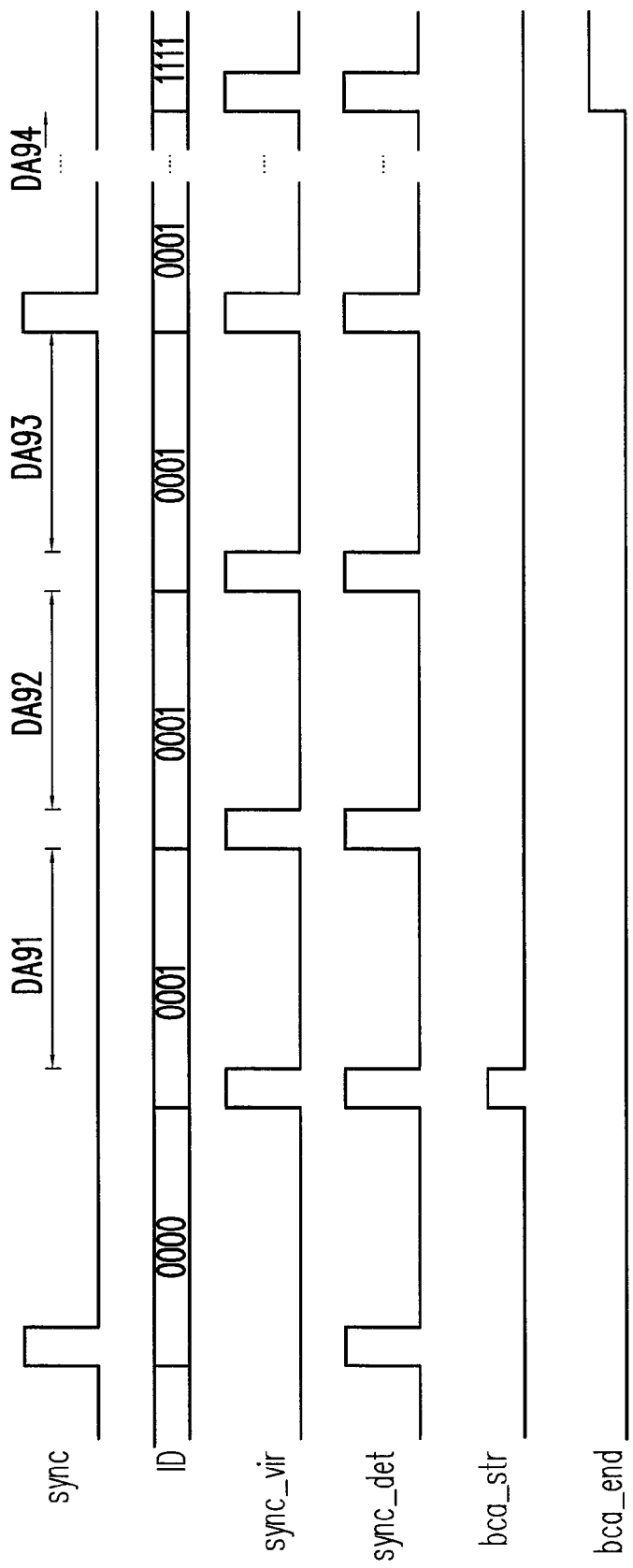
FIG. 9 is an operation time sequence diagram of a match circuit according to still another embodiment of the invention.

In addition, FIG. 9 is an operation time sequence diagram of a match circuit according to still another embodiment of the invention. Referring to FIG. 9, when both the sync bodies having the sync identification codes ID of 0000 and of 1111 are destroyed, the data capturer 433 still can use the composite synchronization signal sync_det to determine the start and termination of the decoding procedure. In other words, even though the sync bodies are destroyed by bolts or scraped, in the present embodiment, the complete sync identification codes still can be detected to execute the decoding procedure so as to correctly capture row data DA91~DA94.

Figure 10:
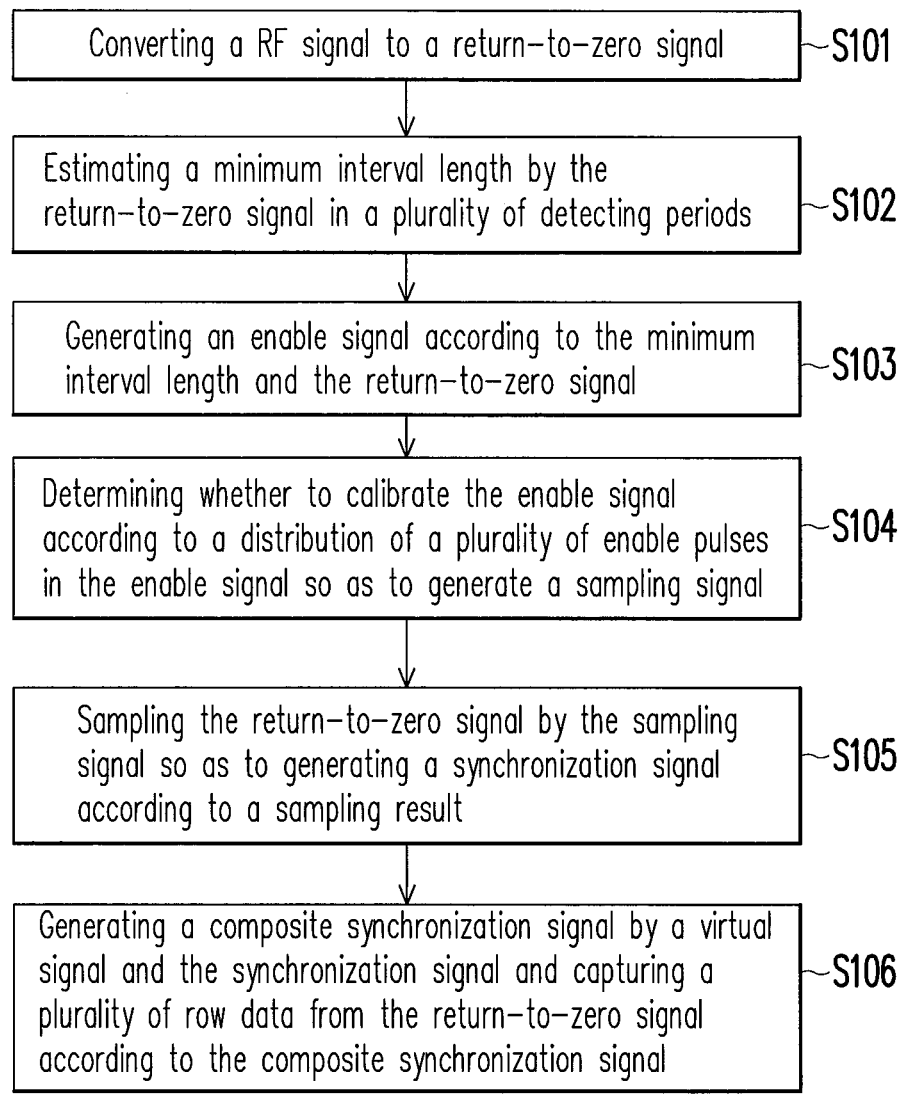
FIG. 10 is a flow chart illustrating a method of data capture according to one embodiment of the invention.

FIG. 10 is a flow chart illustrating a method of data capture according to one embodiment of the invention. Referring to FIG. 10, as shown in step S101, at the beginning, an RF signal is converted to a return-to-zero signal. Next, as shown in step S102, a minimum interval length is estimated by the return-to-zero signal in a plurality of detecting periods. Further, in step S103, an enable signal is generated according to the minimum interval length and the return-to-zero signal. Besides, as shown in step S104, it is determined whether to calibrate the enable signal according to a distribution of a plurality of enable pulses in the enable signal so as to generate a sampling signal. Thereby, as shown in step S105, the return-to-zero signal is sampled by the sampling signal so that a synchronization signal is generated according to a sampling result. Besides, as shown in step S106, a composite synchronization signal is generated by a virtual signal and the synchronization signal, and a plurality of row data is captured from the return-to-zero signal according to the composite synchronization signal. Details in connection with the steps of this embodiment have been described in the above embodiments and therefore not repeated hereinafter.

To sum up, in the invention, the enable signal is generated according to the minimum interval length and appropriately calibrated so as to form the sampling signal. Accordingly, comparing with the related art, it is less possible for the invention to mistakenly estimate the sampling signal and helpful of the invention to reduce the hardware space and the manufacturing cost of the data capture device. Further, the invention utilizes the composite synchronization signal generated by the virtual signal and the synchronization signal to capture the row data. Hence, even though the sync bodies are destroyed by bolts or scraped, the start and termination of the decoding procedure still can be appropriately determined so as to complete the decoding procedure successfully to capture the correct row data.

Although the disclosure have been described with reference to the above embodiments, it will be apparent to one of the ordinary skill in the art that modifications to the described embodiment may be made without departing from the spirit of the described embodiment. Accordingly, the scope of the disclosure will be defined by the attached claims not by the above detailed descriptions.

What is claimed is:

1. A data capture device, comprising:
a signal processing unit, converting a radio frequency (RF) signal to a return-to-zero signal;
a frequency locked circuit, estimating a minimum interval length by the return-to-zero signal in a plurality of detecting periods, generating an enable signal according to the minimum interval length and the return-to-zero signal and determining whether to calibrate the enable signal according to a distribution of a plurality of enable pulses in the enable signal so as to generate a sampling signal; and
a match circuit, sampling the return-to-zero signal by the sampling signal, generating a synchronization signal according to a sampling result, generating a composite synchronization signal by a virtual signal and the synchronization signal and capturing a plurality of row data from the return-to-zero signal according to the composite synchronization signal.

2. The data capture device as claimed in claim 1, wherein the signal processing unit comprises:

a high pass filter (HPF), filtering high frequency noises out of the RF signal; and
a slicer, slicing the filtered RF signal into the return-to-zero signal.

3. The data capture device as claimed in claim 1, wherein the frequency locked circuit comprises:
an interval detector, generating a plurality of reference interval values in the plurality of detecting periods, estimating the minimum interval length according to the plurality of reference interval values, and generating the enable signal by referring to the return-to-zero signal and the minimum interval length, wherein the interval detector obtains a plurality of pulse interval values within each of the plurality of detecting periods by detecting a falling edge of a plurality of return-to-zero pulses in the return-to-zero signal, and selects one from the plurality of pulse interval values as one of the plurality of reference interval values; and
an interval calibrator, detecting an interval between the plurality of enable pulses so as to generate a maximum calibration value and a minimum calibration value, wherein the interval calibrator determines whether to calibrate the enable signal according to the maximum calibration value and the minimum calibration value so as to generate the sampling signal.

4. The data capture device as claimed in claim 3, wherein the interval detector selects a minimum pulse interval value from the plurality of pulse interval values as one of the plurality of reference interval values within each of the plurality of detecting periods.

5. The data capture device as claimed in claim 3, wherein the interval detector selects a maximum reference interval value from the plurality of reference interval values and sets the maximum reference interval value as the minimum interval length.

6. The data capture device as claimed in claim 3, wherein the interval calibrator determines whether ½ of the maximum calibration value is larger than the minimum calibration value, and when ½ of the maximum calibration value is larger than the minimum calibration value, the interval calibrator calibrates the enable signal and outputs the calibrated enable signal as the sampling signal, and when ½ of the maximum calibration value is smaller than the minimum calibration value, the interval calibrator directly outputs the enable signal as the sampling signal.

7. The data capture device as claimed in claim 6, wherein when ½ of the maximum calibration value is larger than the minimum calibration value, the interval calibrator substitutes the maximum calibration value and the minimum calibration value into a calculation formula so as to obtain an interval lock value, and the interval calibrator resets the minimum interval length by the interval lock value and generates the enable signal by referring to the reset minimum interval length and the return-to-zero signal.

8. The data capture device as claimed in claim 7, wherein the maximum calibration value is indicated as Max_den, the minimum calibration value is indicated as Min_den, the interval lock value is indicated as Lock_den, the calculation formula is:

$$\text{Lock\_den} = \text{Max\_den} - \tfrac{1}{4} * \text{Min\_den}.$$

9. The data capture device as claimed in claim 1, wherein the match circuit comprises:
a synchronization signal generator, sampling the return-to-zero signal according to the sampling signal to generate a signal pattern corresponding to the return-to-zero signal, detecting a plurality of sync bodies in the signal pattern and generating the synchronization signal comprising a plurality of synchronization pulses according to a detecting result;

a virtual signal generator, wherein when a first synchronization pulse in the plurality of synchronization pulses is detected, the virtual signal generator starts to generate the virtual signal and automatically generates a virtual pulse in the virtual signal per a predetermined time period;

a data capturer, compensating the synchronization signal by the virtual signal to generate the composite synchronization signal comprising a plurality of composite pulses and capturing the plurality of row data according to the composite synchronization signal.

10. The data capture device as claimed in claim 9, wherein the data capturer simultaneously detects the virtual signal and the synchronization signal, and when either one the plurality of synchronization pulses or one of the plurality of virtual pulses is detected, the data capturer generates the composite pulse corresponding thereto.

11. The data capture device as claimed in claim 9, wherein the data capturer detects a plurality of sync identification codes in the signal pattern according to the plurality of composite pulses, compares the plurality of sync identification codes with a first predetermined code and a second predetermined code, wherein when a first sync identification code in the plurality of sync identification codes matches the first predetermined code, the data capturer starts to execute a decoding procedure, and during the decoding procedure, when a second sync identification code in the plurality of sync identification codes matches the second predetermined code, the data capturer terminates the decoding procedure, wherein the data capturer captures the plurality of row data by the decoding procedure.

12. A method of data capture, comprising:
converting a radio frequency (RF) signal to a return-to-zero signal;
estimating a minimum interval length by the return-to-zero signal in a plurality of detecting periods;
generating an enable signal according to the minimum interval length and the return-to-zero signal;
determining whether to calibrate the enable signal according to a distribution of a plurality of enable pulses in the enable signal so as to generate a sampling signal;
sampling the return-to-zero signal by the sampling signal and generating a synchronization signal according to a sampling result; and
generating a composite synchronization signal by a virtual signal and the synchronization signal and capturing a plurality of row data from the return-to-zero signal by the composite synchronization signal.

13. The method of data capture as claimed in claim 12, wherein steps for converting the RF signal to the return-to-zero signal comprise:
filtering high frequency noises out of the RF signal; and
slicing the filtered RF signal into the return-to-zero signal.

14. The method of data capture as claimed in claim 12, wherein steps for estimating the minimum interval length by the return-to-zero signal in the plurality of detecting periods comprise:
generating a plurality of reference interval values in each of the plurality of detecting periods, and steps for generating the plurality of reference interval values comprising:
obtaining a plurality of pulse interval values by detecting a falling edge of a plurality of return-to-zero pulses in the return-to-zero signal within each of the plurality of detecting periods; and
selecting one from the plurality of pulse interval values as one of the reference interval values; and
estimating the minimum interval length according to the plurality of reference interval values.

15. The method of data capture as claimed in claim 14, further comprising:
selecting a minimum pulse interval value from the plurality of pulse interval values within each of the plurality of detecting periods as one of the plurality of reference interval values.

16. The method of data capture as claimed in claim 14, further comprising:
selecting a maximum reference interval value from the plurality of reference interval values and setting the maximum reference interval value as the minimum interval length.

17. The method of data capture as claimed in claim 12, wherein steps for determining whether to calibrate the enable signal according to the distribution of the plurality of enable pulses in the enable signal so as to generate the sampling signal comprises:
detecting an interval between the plurality of enable pulses so as to generate a maximum calibration value and a minimum calibration value; and
determining whether to calibrate the enable signal according to the maximum calibration value and the minimum calibration value so as to generate the sampling signal.

18. The method of data capture as claimed in claim 17, wherein steps for determining whether to calibrate the enable signal according to the maximum calibration value and the minimum calibration value so as to generate the sampling signal comprise:
determining whether $\frac{1}{2}$ of the maximum calibration value is larger than the minimum calibration value;
when $\frac{1}{2}$ of the maximum calibration value is larger than the minimum calibration value, calibrating the enable signal and outputting the calibrated enable signal as the sampling signal; and
when $\frac{1}{2}$ of the maximum calibration value is smaller than the minimum calibration value, directly outputting the enable signal as the sampling signal.

19. The method of data capture as claimed in claim 18, wherein steps for, when $\frac{1}{2}$ of the maximum calibration value is larger than the minimum calibration value, calibrating the enable signal comprise:
substituting the maximum calibration value and the minimum calibration value into a calculation formula so as to obtain an interval lock value; and
resetting the minimum interval length according to the interval lock value and generating the enable signal by referring to the reset minimum interval length and the return-to-zero signal.

20. The method of data capture as claimed in claim 19, wherein the maximum calibration value is indicated as Max_den, the minimum calibration value is indicated as Min_den, the interval lock value is indicated as Lock_den, the calculation formula is:

$$Lock\_den = Max\_den - \tfrac{1}{4} \times Min\_den.$$

21. The method of data capture as claimed in claim 12, wherein steps for sampling the return-to-zero signal by the sampling signal and generating the synchronization signal according to the sampling result comprise:
sampling the return-to-zero signal by the sampling signal to generate a signal pattern corresponding to the return-to-zero signal; and detecting a plurality of sync bodies in the signal pattern and generating the synchronization signal comprising a plurality of synchronization pulses according to a detecting result.

22. The method of data capture as claimed in claim 21, wherein steps for generating the composite synchronization signal by the virtual signal and the synchronization signal and capturing the plurality of row data from the return-to-zero signal by the composite synchronization signal comprise:
when a first synchronization pulse in the plurality of synchronization pulses is detected, starting to generate the virtual signal and automatically generating a virtual pulse in the virtual signal per a predetermined time period;
compensating the synchronization signal by the virtual signal to generate the composite synchronization signal comprising a plurality of composite pulses; and
sampling the return-to-zero signal according to the composite synchronization signal to capture the plurality of row data.

23. The method of data capture as claimed in claim 22, wherein steps for compensating the synchronization signal by the virtual signal to generate the composite synchronization signal comprising the plurality of composite pulses comprise:
simultaneously detecting the virtual signal and the synchronization signal; and
when either one of the plurality of synchronization pulses or one of the plurality of virtual pulses is detected, generating the corresponding composite pulse.

24. The method of data capture as claimed in claim 22, wherein steps for sampling the return-to-zero signal according to the composite synchronization signal to capture the plurality of row data comprise:
detecting a plurality of sync identification codes in the signal pattern according to the plurality of composite pulses;
comparing the plurality of sync identification codes with a first predetermined code and a second predetermined code, wherein when a first sync identification code in the plurality of sync identification codes matches the first predetermined code, a decoding procedure is executed, and during the decoding procedure, when a second sync identification code in the plurality of sync identification codes matches the second predetermined code, the decoding procedure is terminated; and
capturing the plurality of row data by the decoding procedure.

\* \* \* \* \*